(12) United States Patent
Jeong

(10) Patent No.: US 7,339,534 B2
(45) Date of Patent: Mar. 4, 2008

(54) ANTENNA APPARATUS FOR A PORTABLE TERMINAL

(75) Inventor: Sung-Hun Jeong, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/418,370

(22) Filed: May 5, 2006

(65) Prior Publication Data

US 2007/0035456 A1    Feb. 15, 2007

(30) Foreign Application Priority Data

Aug. 10, 2005    (KR) ............ 10-2005-0073278

(51) Int. Cl.
*H01Q 1/24*    (2006.01)
(52) U.S. Cl. .................... 343/702; 343/846
(58) Field of Classification Search ........ 343/702, 343/700 MS, 846
See application file for complete search history.

(56) References Cited

U.S. PATENT DOCUMENTS

| 5,539,418 | A  |         | 7/1996  | Egashira et al. |
|-----------|----|---------|---------|-----------------|
| 6,166,694 | A  |         | 12/2000 | Ying            |
| 6,198,943 | B1 |         | 3/2001  | Sadler et al.   |
| 6,590,539 | B2 |         | 7/2003  | Shinichi        |
| 7,053,843 | B2 | *       | 5/2006  | Nysen ............ 343/702 |

FOREIGN PATENT DOCUMENTS

JP     57-002104    1/1982
KR   2006-0057948   5/2006

* cited by examiner

*Primary Examiner*—Hoang V. Nguyen
(74) *Attorney, Agent, or Firm*—Roylance, Abrams, Berdo & Goodman, LLP

(57) ABSTRACT

An antenna apparatus for a portable terminal includes an antenna device contained in a housing of the terminal and a coaxial cable for connecting the antenna device to circuitry of the terminal. The coaxial cable connects a power feed and a ground of the antenna device to a power feed and a ground of the circuitry, respectively. The antenna apparatus for a portable terminal is advantageous in that, since the coaxial cable supplies power to the antenna device, which is spaced apart from the RF circuitry, and grounds are provided to the circuitry, which includes the RF circuitry, and to the antenna device, respectively, the connection properties and antenna characteristics are stable. Thus, even when an additional component (such as a camera module) is installed and the circuit configuration is changed, the antenna device, which is positioned on the upper end of the terminal, still exhibits optimal radiation performance.

17 Claims, 2 Drawing Sheets

ANTENNA APPARATUS FOR A PORTABLE TERMINAL

CROSS-REFERENCE TO RELATED APPLICATION

This application claims the benefit under 35 U.S.C. § 119(a) of a Korean patent application entitled "Antenna Apparatus For Portable Terminal", filed in the Korean Intellectual Property Office on Aug. 10, 2005 and assigned Ser. No. 2005-73278, the entire contents of which are hereby incorporated by reference.

BACKGROUND OF THE INVENTION

1. Field of the Invention

The present invention relates to a portable terminal. More particularly, the present invention relates to an antenna apparatus for a portable terminal.

2. Description of the Related Art

In general, a portable terminal is an appliance for providing wireless communication between users or between a user and a service provider via telecommunication base stations, for example. In addition to voice communication services, users may be provided with various other services, such as short message transmission, mobile banking, TV viewing, online games, and VODs (videos-on-demand), via the portable terminals.

Portable terminals are equipped with an antenna apparatus to maintain at least a predetermined level of reception ratio and speech quality regardless of varying radio environments. Antenna apparatuses for portable terminals have different specifications, including length, depending on the frequency band used by corresponding service providers.

The antenna apparatuses may be classified into internal antennas that are installed inside the housing of terminals and external antennas that protrude from the housing. Internal antennas include meander-type antennas, loop antennas, inverted L-type antennas, and planar inverted F-type antennas. External antennas include protruding antennas, which have antenna devices (for example, helical antennas) contained in the housings of the antennas, whip antennas, which are installed on the housings of terminals and adapted to extend/retract, and antenna apparatuses combining features of both helical and whip antennas. To improve the performance of terminals, such as portability, the prevailing trend is to use internal antennas.

Meanwhile, portable terminals are equipped with various additional apparatuses to provide more functions. In particular, camera modules have been rapidly developed recently, and, in accordance with current trends, most portable terminals are equipped with camera modules.

As the camera modules incorporate additional features such as an optical zoom function, their size increases. Consequently, the circuit configuration of the circuit boards of portable terminals, on which the camera modules are mounted, needs to be modified. Such modifications have a direct influence on internal antennas.

In conventional internal antenna apparatuses, the antenna device is directly connected with the RF (radio frequency) circuitry on the circuit board. This is because, as in the case of conventional external antennas, internal antennas are mounted on the upper end of the terminal housing for optimal radiation characteristics. Thus, the RF circuitry's position on the circuit board does not need to be changed to accommodate an internal antenna.

However, when camera modules increase in size, such as by incorporating an optical zoom function, the RF circuitry must be moved. More specifically, a mounting space must be secured in the rear portion of the terminal housing to mount a camera module having an optical zoom function. The camera module must be mounted on the upper end of the rear portion of the terminal housing because a battery pack is generally mounted on the lower end of the rear portion of the terminal housing. As a result, the antenna device, which is mounted on the upper end of the terminal housing, must be separated from the RF circuitry which is installed on the circuit board.

When the RF circuitry and the antenna device are spaced apart from each other in this manner, signal quality may degrade due to noise and loss. In an attempt to solve this problem, efforts have been made to move the radiation unit of internal antennas towards the RF circuitry. However, the position of the radiation unit is difficult to change, because such changes make it difficult to provide the stable antenna characteristics (for example, radiation performance) which are necessary for the terminal and affect the terminal design.

Accordingly, there is a need for an improved antenna apparatus for a mobile terminal having an antenna device which may be separated from the RF circuitry, while still maintaining stable operating characteristics.

SUMMARY OF THE INVENTION

An aspect of the present invention is to address at least the above problems and/or disadvantages and to provide at least the advantages described below. Accordingly, an aspect of the present invention is to provide an antenna apparatus for a portable terminal which has a stable antenna device that is separated from the RF circuitry.

Another aspect of the present invention is to provide an antenna apparatus for a portable terminal having an antenna device which is separated from the RF circuitry, so that the antenna device has stable characteristics, without changing the position of the antenna device or the design of the portable terminal.

In accordance with an exemplary embodiment of the present invention, an antenna apparatus for a portable terminal comprises an antenna device contained in a housing of the terminal and a coaxial cable for connecting the antenna device to circuitry of the terminal. The coaxial cable connects a power feed and a ground of the antenna device to a power feed and a ground of the circuitry, respectively.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF AN EXEMPLARY EMBODIMENT

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
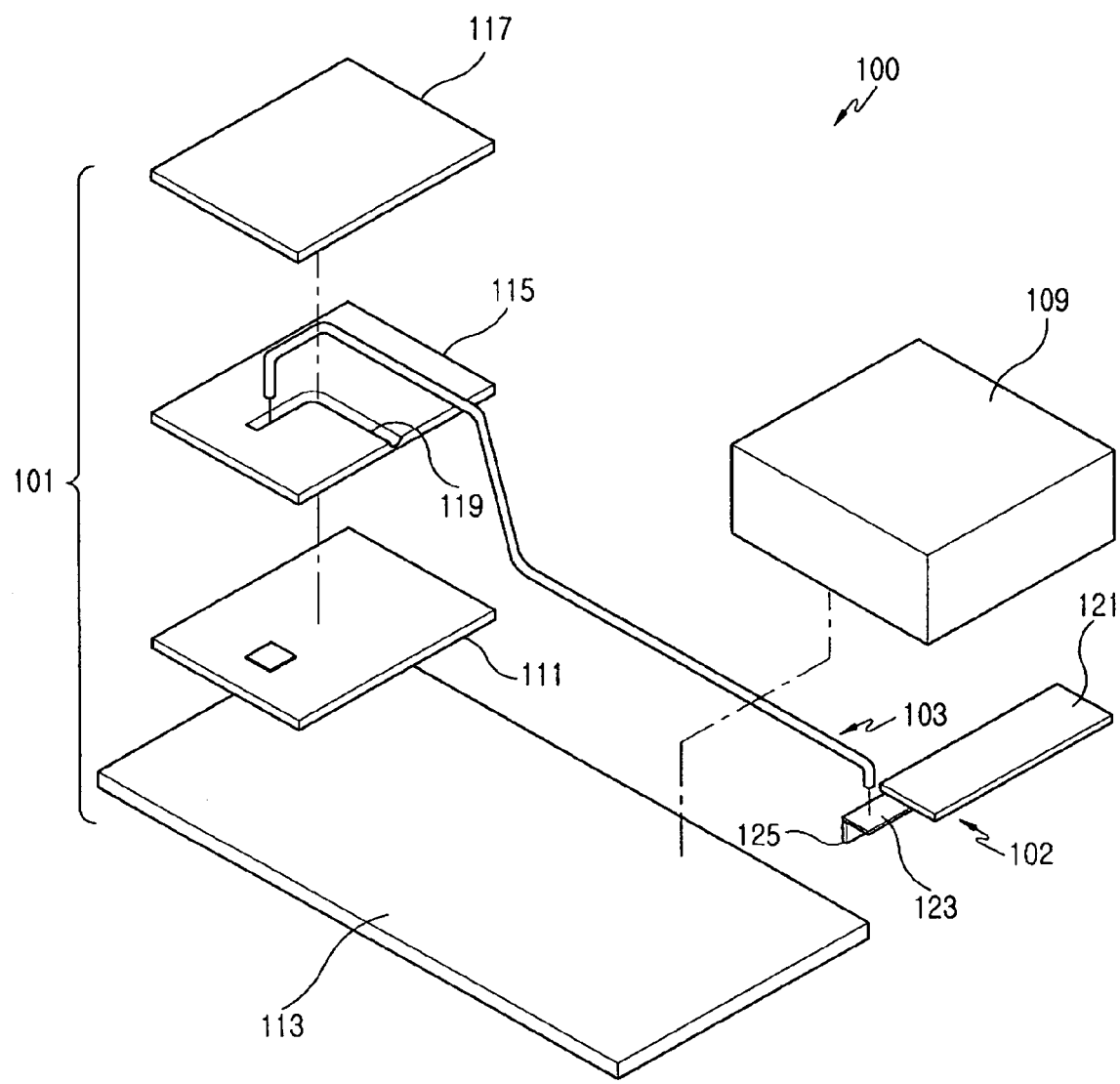
FIG. 1 is an exploded perspective view showing an antenna apparatus for a portable terminal according to an exemplary embodiment of the present invention.
Figure 2:
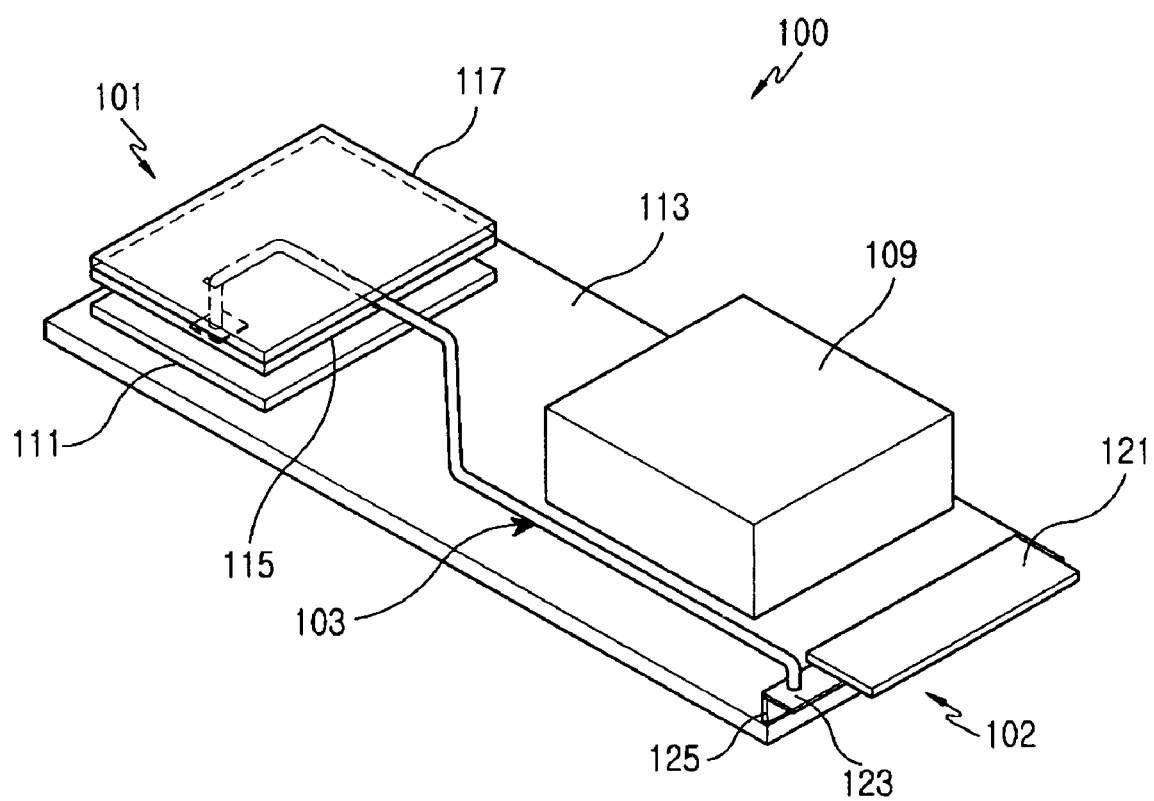
FIG. 2 is an assembled perspective view of the antenna apparatus shown in FIG. 1.

FIG. 1 is an exploded perspective view showing an antenna apparatus 100 for a portable terminal according to an exemplary embodiment of the present invention, and FIG. 2 is an assembled perspective view of the antenna apparatus 100 shown in FIG. 1.

As shown in FIGS. 1 and 2, the antenna apparatus 100 for a portable terminal according to an exemplary embodiment of the present invention includes an antenna device 102, a main circuit board 111, a coaxial cable 103 for connecting the antenna device 102 to the main circuit board 111, and a camera module 109 positioned between the antenna device 102 and the main circuit board 111.

The main circuit board 111 is part of circuitry 01, which performs core functions of the terminal, including communication, information storage, and operation. In addition to the main circuit board 111, the circuitry 101 includes a sub-circuit board 117, a support frame 113 for supporting a display device of the terminal, for example, and providing a ground, and a sub-frame 115.

The main circuit board 111 includes RF circuitry (not shown) and is mounted on one surface of the support frame 113. The display device (not shown) is mounted on the other surface of the support frame 113. The camera module 109 is installed on one side of the main circuit board 111. The antenna device 102 is connected to the RF circuitry of the main circuit board 111.

The sub-circuit board 117 is positioned so as to face the main circuit board 111. When the sub-frame 115 is mounted on the sub-circuit board 117, it is interposed between the main circuit board 111 and the sub-circuit board 117.

The main circuit board 111 and the sub-circuit board 115 have printed circuit patterns formed thereon, which provide them with grounds, respectively. The support frame 113 and the sub-frame 115 are made of a metallic material (for example, magnesium) so that they can provide grounds while supporting the display device and the circuit boards.

The antenna device 102 is mounted on an end of the support frame 113. As a result, the camera module 109 is positioned between the antenna device 102 and the RF circuitry of the main circuit board 111. In other words, the antenna device 102 and the main circuit board 111 are separated and spaced apart from each other.

The antenna device 102 includes a radiation unit 121, a power feed 123, and a ground 125. The radiation unit 121 directly emits and receives radio frequencies. The power feed 123 and the ground 125 are connected to a power feed and a ground, respectively, which are provided by the RF circuitry of the main circuit board 111, for example, via the coaxial cable 103.

The coaxial cable 103, which is connected to the antenna device 102, bypasses the camera module 109 and is routed between the sub-circuit board 117 and the sub-frame 115. The sub-frame 115 has a guide groove 119 formed thereon for receiving the coaxial cable 103. The coaxial cable 103 is disposed in the guide groove 119 and extends through the sub-frame 115 to be connected to the RF circuitry of the main circuit board 111.

Since the coaxial cable 103 is disposed in the guide groove 119, it is enclosed by the respective grounds provided by the sub-circuit board 117 and the sub-frame 115. This suppresses noise generation.

The coaxial cable 103 may have a lead extending from the power feed 123 of the antenna device 102 to the power feed of the RF circuitry, as well as a lead extending from the ground 125 of the antenna device 102 to the ground, which is provided on the main circuit board 111, or to the support frame.

As mentioned above, the antenna apparatus 100 for a portable terminal according to the present invention has an antenna device 102 spaced apart from the RF circuitry on the main circuit board 111, while being connected to the RF circuitry via the coaxial cable 103, so that the ground on the RF circuitry is connected to the ground 125 on the antenna device 102. This stabilizes the antenna characteristics.

Consequently, the antenna apparatus for a portable terminal according to the exemplary embodiment of the present invention is advantageous in that, since the coaxial cable supplies power to the antenna device, which is spaced apart from the RF circuitry, and grounds are provided to the circuitry, which includes the RF circuitry, and to the antenna device, respectively, the connection properties and the antenna characteristics are stabilized. Even when an additional component (such as a camera module) is installed and the circuit configuration is varied, the antenna device, which is positioned on the upper end of the terminal, can still exhibit optimal radiation performance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An antenna apparatus for a portable terminal comprising:
   an antenna device disposed in a housing of the terminal; and
   a coaxial cable for connecting the antenna device to circuitry of the terminal, the coaxial cable connecting a power feed and a ground of the antenna device to a power feed and a ground of the circuitry, respectively, wherein the circuitry comprises:
       a main circuit board;
       a sub-circuit board positioned so as to face the main circuit board; and
       a sub-frame attached to the sub-circuit board and interposed between the sub-circuit board and the main circuit board.

2. The antenna apparatus for a portable terminal as claimed in claim 1, further comprising a guide groove formed on the sub-frame, the coaxial cable being disposed in the guide groove while being enclosed by a ground of the sub-circuit board and a ground of the sub-frame.

3. The antenna apparatus for a portable terminal as claimed in claim 2, wherein the coaxial cable extends through the sub-frame to be connected to the main circuit board.

4. The antenna apparatus for a portable terminal as claimed in claim 1, further comprising a guide groove formed on the sub-frame and a support frame having a surface, the main circuit board being mounted on the surface, the coaxial cable being disposed in the guide groove and extending through the sub-frame to be connected to a power feed of the main circuit board and to the support frame, respectively.

5. The antenna apparatus for a portable terminal as claimed in claim 4, wherein the support frame provides the ground of the circuitry.

6. The antenna apparatus for a portable terminal as claimed in claim 1, wherein the sub-frame provides the ground of the circuitry.

7. The apparatus for a portable terminal as claimed in claim 1, wherein a camera module is positioned between the antenna device and the main circuit board.

8. An antenna apparatus for a portable terminal comprising:
   circuitry for performing functions of the portable terminal, the circuitry comprising a power feed and a ground;
   an antenna device for emitting and receiving radio frequencies, the antenna device comprising a power feed and a ground; and
   a coaxial cable for connecting the antenna device to the circuitry of the terminal, the coaxial cable connecting the power feed and the ground of the antenna device to the power feed and the ground of the circuitry, respectively,
   wherein the circuitry comprises:
      a sub-circuit board comprising a ground; and
      a sub-frame disposed proximate to the sub-circuit board, the sub-frame comprising a ground and a guide groove.

9. The antenna apparatus for a portable terminal as claimed in claim 8, wherein the coaxial cable is disposed in the guide groove and is enclosed by the ground of the sub-circuit board and the ground of the sub-frame.

10. The antenna apparatus for a portable terminal as claimed in claim 9, further comprising a main circuit board disposed proximate to the sub-frame.

11. The antenna apparatus for a portable terminal as claimed in claim 10, wherein the coaxial cable extends through the sub-frame to be connected to the main circuit board.

12. The antenna apparatus for a portable terminal as claimed in claim 11, further comprising a support frame having a surface, the main circuit board being mounted on the surface.

13. The antenna apparatus for a portable terminal as claimed in claim 12, wherein the coaxial cable is connected to a power feed of the main circuit board and to the support frame, respectively.

14. The antenna apparatus for a portable terminal as claimed in claim 13, wherein the support frame provides the ground of the circuitry.

15. The antenna apparatus for a portable terminal as claimed in claim 14, further comprising a camera module positioned between the antenna device and the main circuit board.

16. The antenna apparatus for a portable terminal as claimed in claim 8, wherein the sub-frame provides the ground of the circuitry.

17. An antenna apparatus for a portable terminal comprising:
   an antenna device disposed in a housing of the terminal;
   circuitry of the terminal, including a sub-circuit board having a ground, and a sub-frame disposed proximate to the sub-circuit board, the sub-frame having a ground and a guide groove; and
   a coaxial cable connecting the antenna device to the circuitry of the terminal, a portion of the coaxial cable being disposed in the guide groove and enclosed by respective grounds of the sub-circuit board and the sub-frame.

* * * * *